(12) United States Patent
Elliott et al.

(10) Patent No.: US 8,880,816 B2
(45) Date of Patent: *Nov. 4, 2014

(54) REDUCING STORAGE SYSTEM POWER CONSUMPTION IN A REMOTE COPY CONFIGURATION

(75) Inventors: John C. Elliott, Tucson, AZ (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/556,521

(22) Filed: Jul. 24, 2012

(65) Prior Publication Data

US 2012/0290684 A1 Nov. 15, 2012

Related U.S. Application Data

(63) Continuation of application No. 12/409,219, filed on Mar. 23, 2009, now Pat. No. 8,285,948.

(51) Int. Cl.
*G06F 12/00* (2006.01)
*G06F 1/32* (2006.01)
*G06F 11/20* (2006.01)

(52) U.S. Cl.
CPC .......... *G06F 1/3221* (2013.01); *G06F 11/2071* (2013.01)
USPC ........... 711/154; 711/162; 713/300; 713/320; 713/340

(58) Field of Classification Search
USPC ................... 711/154, 162; 713/300, 320, 340
See application file for complete search history.

(56) References Cited

U.S. PATENT DOCUMENTS

| 6,820,209 | B1 | 11/2004 | Culbert et al. |
|---|---|---|---|
| 7,457,982 | B2 | 11/2008 | Rajan |
| 2005/0289361 | A1 | 12/2005 | Sutardja |
| 2006/0274755 | A1 | 12/2006 | Brewer et al. |
| 2007/0198750 | A1 | 8/2007 | Moilanen |
| 2007/0250610 | A1 | 10/2007 | Haun et al. |
| 2007/0250679 | A1 | 10/2007 | Umemura et al. |
| 2007/0283112 | A1 | 12/2007 | Fujibayashi |
| 2007/0294552 | A1 | 12/2007 | Kakihara et al. |
| 2008/0104443 | A1 | 5/2008 | Akutsu et al. |
| 2008/0168223 | A1 | 7/2008 | Reeves et al. |
| 2009/0055507 | A1 | 2/2009 | Oeda et al. |
| 2010/0241818 | A1 | 9/2010 | Elliott et al. |

FOREIGN PATENT DOCUMENTS

WO WO 2008/051372 A2 5/2008

OTHER PUBLICATIONS

U.S. Appl. No. 12/409,219.
Weissel, Andreas et al., "Cooperative I/O—A Novel I/O Semantics for Energy-Aware Applications", USENIX, Proceedings of the 5th Symposium on Operating Systems Design and Implementation, Boston, Massachusetts, Dec. 9-11, 2002, 13 pages.

*Primary Examiner* — Jasmine Song
(74) *Attorney, Agent, or Firm* — Stephen J. Walder, Jr.; Randall J. Bluestone (57) ABSTRACT

A storage system in a remote copy configuration includes a redirect mechanism. The redirect mechanism determines whether to redirect read operations to a remote storage system, which is part of the remote copy configuration, based on a power management policy and a redirect policy. The redirect mechanism takes into account response time data, input/output demand, power utilization data, and input/output classes and priorities to determine whether to redirect read access requests to the remote storage system. Redirection of read operations to the remote storage system results in reduced power consumption at the local system.

30 Claims, 3 Drawing Sheets

REDUCING STORAGE SYSTEM POWER CONSUMPTION IN A REMOTE COPY CONFIGURATION

This application is a continuation of application Ser. No. 12/409,219, filed Mar. 23, 2009, status allowed.

BACKGROUND

The present application relates generally to an improved data processing apparatus and method and more specifically to an apparatus and method for reducing storage system power consumption in a remote copy configuration.

Many large business entities enter into power usage agreements that cap power utilization for a facility. The power utilization cap may vary during different time periods. The financial penalty for violating the power utilization cap can be very high.

For disk storage systems, power consumption is a function of the number of active drives and input/output (I/O) activity at the drives. For large disk arrays, the power requirements are dominated by the disk drive power needs. Reduction of power consumption may be accomplished by turning off drives or by reducing host I/O demand.

In practice, turning off drives or reducing I/O demand may be impractical. Performance requirements on the system may not tolerate the long access time required to turn on a drive to access the data. Also, the business needs may not permit reduction of I/O demand.

SUMMARY

In one illustrative embodiment, a method, in a data processing system, is provided for reducing storage system power consumption in a remote copy configuration. The method comprises receiving an access request and responsive to the access request being a read request, determining whether to redirect the read request to a remote storage system based on a power management policy. The method further comprises, responsive to a determination to redirect the read request to the remote storage system, redirecting the read request to the remote storage system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for reducing storage system power consumption in a remote copy configuration. A data processing system is implemented as a remote dual copy type system for data recovery. When facility power management policies dictate that a power reduction is required, the storage system services all or some of the read requests from a remote secondary system. Redirecting all or some of the read requests away from the primary storage system reduces I/O serviced by the drives in the primary storage system, which results in reduced power consumption by the primary storage system.

Figure 1:
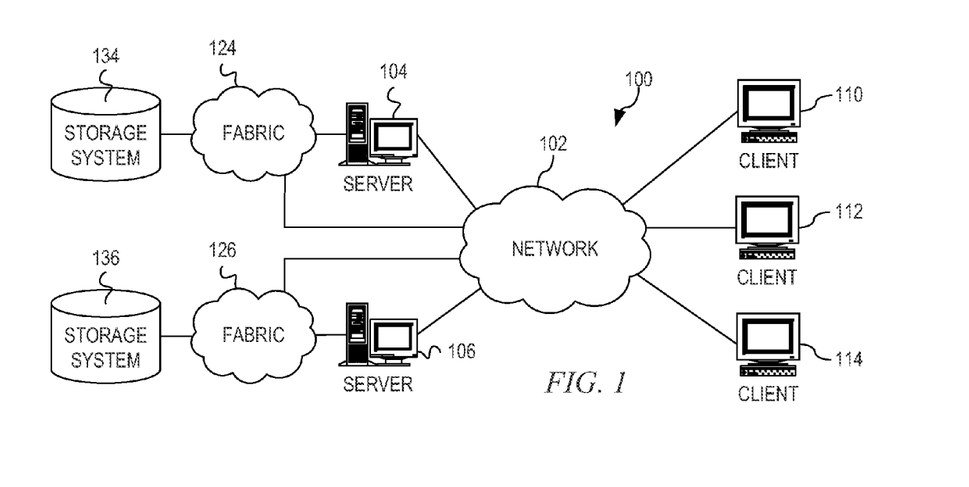
FIG. 1 depicts a pictorial representation of an example distributed data processing system in which aspects of the illustrative embodiments may be implemented.
Figure 2:
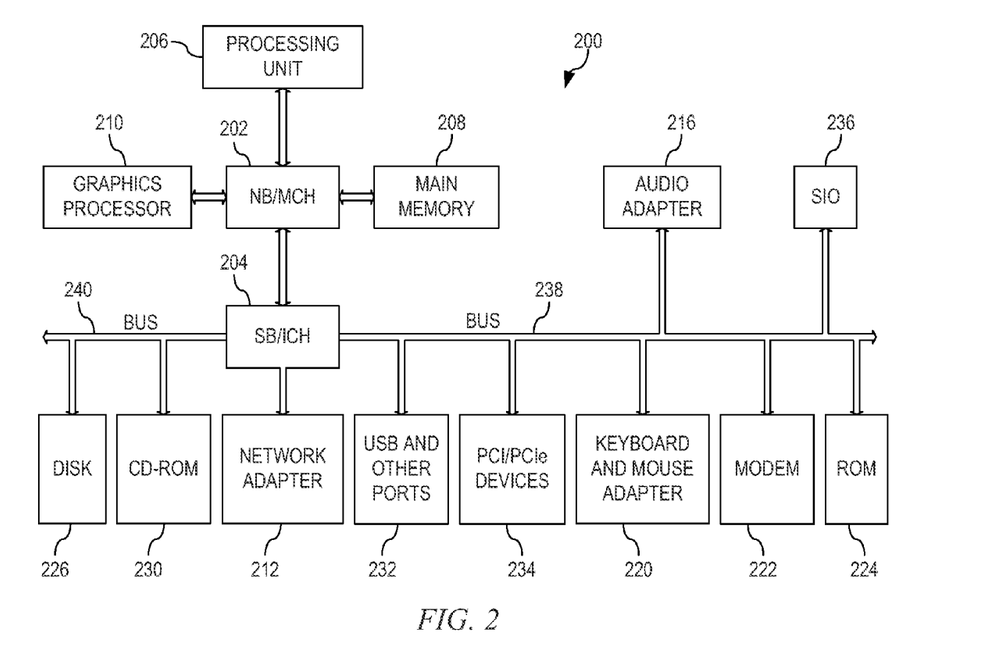
FIG. 2 is a block diagram of an example data processing system in which aspects of the illustrative embodiments may be implemented.
Figure 3:
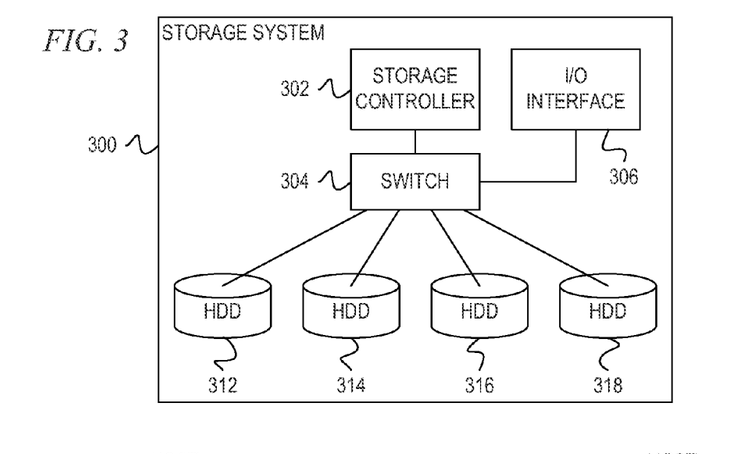
FIG. 3 is a block diagram depicting an example storage system in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers, communication fabrics, and storage systems in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102. Server 104 is also connected to storage system 134 via fabric 124, and server 106 is connected to storage system 136 via fabric 126. In addition, clients 110, 112, and 114 are also connected to network 102. These clients 110, 112, and 114 may be, for example, personal computers, network computers, or the like. In the depicted example, server 104 may provide data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Fabrics 124, 126 may be any communications fabric that supports I/O traffic between a host and a storage system. For example, fabrics 124, 126 may be Fibre Channel, serial attached SCSI, Ethernet, or the like, and may include switches or routers to support I/O communication. Fabrics 124, 126 may also support connection to network 102. For example, server 106 may access storage system 134 via network 102 and fabric 124 without intervention of server 104. Similarly, server 104 may access storage system 136 without intervention of server 106.

In accordance with an illustrative embodiment, distributed data processing system 100 provides a dual remote copy configuration for disaster recovery. That is, when server 104 performs a write operation to storage system 134, the write operation is also performed at storage system 136. The dual remote copy may be performed by the host, such as server 104, or by the storage system itself, such as storage system 134. For example, server 104 may write data to storage system 134 and have the data copied to storage system 136 such that if storage system 134 were to fail, server 104 may then read the data from storage system 136.

Storage system 136 may be placed at a remote location from storage system 134, perhaps on a different continent. Thus, if there was a disaster, such as a fire or the like, and storage system 134 was destroyed, the data would be safe at storage system 136, and storage system 134 could be recreated using the data at storage system 136.

For many disk storage systems, read operations greatly outnumber the write operations. Typically, 70% or higher of the 110 operations to a storage system are data reads. Even with effective caching, a significant portion of those I/O requests result in access to physical drives, which results in increased power utilization. Because hard drives, tape drives, optical drives, and the like include electro-mechanical devices, I/O to the drives uses much more power than transmitting 110 over a fabric or network. I/O to the drives may account for 25-30%, or possibly more, of the power consumed by a storage system. For large storage systems, the disk power may exceed 70% of the total system power.

In accordance with an illustrative embodiment, policies for I/O classes are established to allow a portion to all of the read requests to be serviced by a remote storage system. Writes are still performed on both the primary and secondary storage systems to maintain a synchronized data image. Maintaining synchronous dual copies maintains the failover capability in case of disaster. However, the storage system, such as storage system 134, may redirect all or a portion of the read I/O requests to the remote storage system, such as storage system 136. On a heavily used system, reducing the number of I/O seen by the drives by 70% could result in disk drive power consumption reduction on the order of 15%. This reduction in power consumption could allow the system to meet I/O demand while avoiding a costly cap violation.

Redirecting I/O requests to a remote storage system may result in increased response times, which may be undesirable for some types of applications. The storage system may perform a more granular redirection of the I/O reads if maximum power reduction is not required. Classification of I/O types allows the storage system to identify which reads can be permitted to have response time degradation. Classification of I/O types also provides a priority of which I/O reads get redirected first.

With reference now to FIG. 2, a block diagram of an example data processing system is shown in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems. Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

FIG. 3 is a block diagram depicting an example storage system in accordance with an illustrative embodiment. Storage enclosure 300, which may be storage system 134 or storage system 136 in FIG. 1, for example, is comprised of storage controller 302, which may be a redundant array of independent disks (RAID) controller or a non-RAID controller. Storage controller 302 communicates with hard disk drives (HDDs) 312, 314, 316, and 318 through switch 304. Switch 304 may be, for example, a serial attached SCSI (SAS) switch. Other devices in a storage area network (SAN) may write data to or read data from storage enclosure 300 by connection to switch 304 via I/O interface 306. Storage controller 302 may be a processor operating under control of instructions stored in a memory (not shown).

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Figure 4:
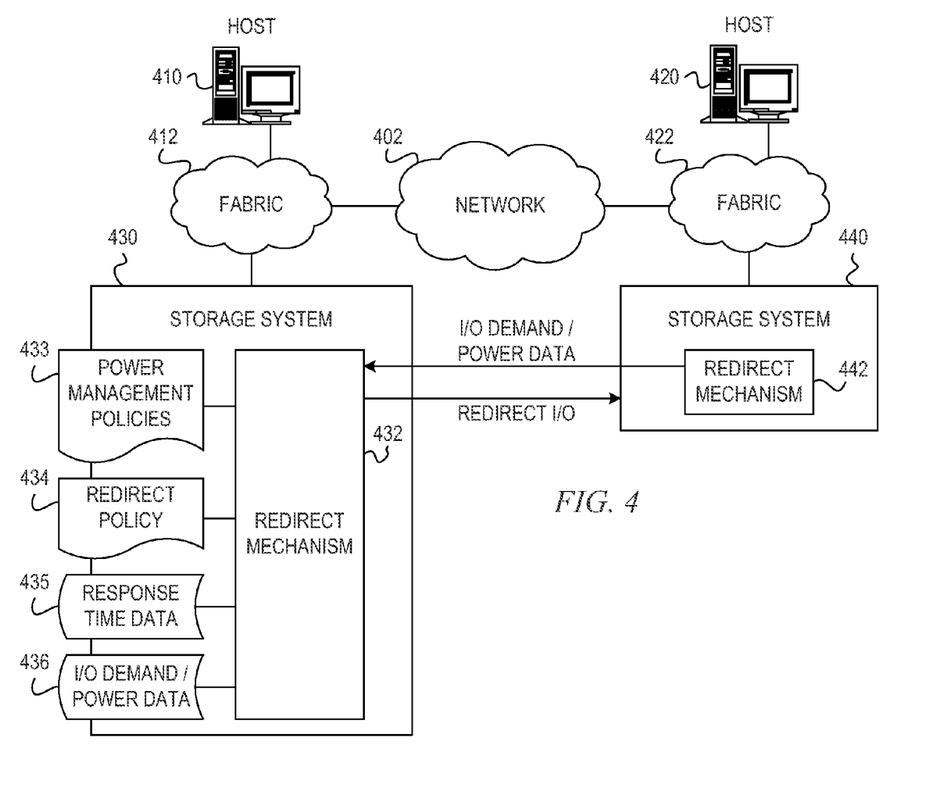
FIG. 4 is a block diagram depicting a data processing system with remote copy in accordance with an illustrative embodiment.

FIG. 4 is a block diagram depicting a data processing system with remote copy in accordance with an illustrative embodiment. Host 410 communicates with storage system 430 via fabric 412. Host 420 communicates with storage system 440 via fabric 422. Host 410 and storage system 430 may communicate with storage system 440 via fabrics 412, 422 and network 402. Similarly, host 420 and storage system 440 may communicate with storage system 430 via fabrics 412, 422 and network 402.

Storage system 430 and storage system 440 provide a remote dual copy configuration for disaster recovery. That is, when either host 410 or host 420 writes to storage system 430 or storage system 440, the write is directed to both storage system 430 and storage system 440 to provide a mirror copy on a separate storage system. By design, storage system 430 and storage system 440 may be geographically remote from one another. As such, storage system 430 and storage system 440 are likely in separate power regions.

Many large business entities enter into power usage agreements that cap power utilization for a facility. The financial penalty for violating the power utilization cap can be very high. For disk storage systems, power consumption is a function of the number of active drives and input/output (I/O) activity at the drives. For large disk arrays, the power requirements are dominated by the disk drive power needs. Reduction of power consumption may be accomplished by turning off drives or by reducing host I/O demand; however, turning off drives or reducing I/O demand may be impractical.

As stated above, I/O to the drives may account for 25-30%, or possibly more, of the power consumed by a storage system. For large storage systems, the disk power may exceed 70% of the total system power. On a heavily used system, reducing the number of I/O seen by the drives by 70% could result in disk drive power consumption reduction on the order of 15%. This reduction in power consumption could allow the system to meet I/O demand while avoiding a costly cap violation.

In accordance with an illustrative embodiment, storage system 430 includes redirect mechanism 432, which may redirect all or some of the read I/O requests to storage system 440 to reduce power consumption. Storage system 430 includes power management policies 433 and redirect policy 434. In addition, storage system 430 collects response time data 435 and I/O demand and power data 436. Storage system 440 sends I/O demand and power usage data to storage system 430. I/O demand and power data 436 may include data for storage system 430 and storage system 440.

Power management policies 433 define the power requirements based on power use agreements and the amount of power allocated to storage system 430. Storage system 430 collects response time data 435 to determine the increase in latency for I/O redirected to storage system 440. Storage system 430 collects I/O demand and power data for both storage system 430 and storage system 440. Storage system 430 may then redirect I/O to storage system 440 to balance I/O demand and power usage between storage system 430 and storage system 440.

Redirect policy 434 defines parameters under which storage system 430 redirects I/O to storage system 440. For example, redirect policy 434 may include power thresholds for redirections, classes of I/O for which redirection is permitted, latency thresholds, I/O demand thresholds, and the like. Redirect mechanism 432 may receive I/O demand and power data from redirect mechanism 442 in storage system 440.

As a specific example, redirect policy 434 may define that redirect mechanism 432 is to redirect I/O reads to storage system 440 when power usage reaches 80% of the cap. This threshold may be a percentage of the cap or an amount of power consumed by the storage system. Redirect policy 434 may also define a tiered threshold such that above a first threshold the redirect mechanism 432 redirects a first percentage of I/O, above a second threshold the redirect mechanism 432 redirects a second percentage of I/O, and so forth. In fact, redirect policy 434 may define a critical threshold above which storage system 430 turns off drives and redirect mechanism 432 redirects all I/O reads.

In this example implementation, redirect policy 434 may also indicate that redirect mechanism 432 is to stop redirecting I/O reads when latency becomes higher than a predetermined threshold, which is based on the latency associated with turning on a drive. In other words, when redirecting I/O to the remote storage system becomes detrimental to performance relative to turning off drives, then storage system 430 may reduce power by turning off drives rather than redirecting I/O.

As another example, redirect policy 434 may define an I/O demand threshold for the remote storage system. That is, redirect policy 434 may indicate that redirect mechanism 432 is not to redirect I/O to storage system 440 when storage system 440 experiences high I/O demand. As such, redirect mechanism 432 may determine that redirection is not permitted when such I/O redirection would adversely affect performance of the remote storage system. By taking I/O demand into account, redirect mechanism 432 may actually perform a type of load balancing between the two storage systems, thus leveraging the remote storage system for disaster recovery and reduced local power consumption while still ensuring acceptable performance of both storage systems.

As a further example, redirect policy 434 may define a power threshold for the remote storage system. In other words, redirect policy 434 may indicate that redirect mechanism 432 is not to redirect I/O to storage system 440 when storage system 440 experiences high power consumption. Redirecting I/O to storage system 440 causes I/O to be serviced by the physical drives at storage system 440, which results in higher power consumption at storage system 440. Thus, redirect mechanism 432 may determine that redirection is not permitted when such I/O redirection could potentially cause storage system 440 to exceed its own power cap.

In fact, if storage system 440 also includes a redirect mechanism 442 like redirect mechanism 432 and both storage system 430 and storage system 440 are close to their power caps, then storage system 440 could redirect an I/O read back to storage system 430, which could result in an I/O read being bounced back and forth between storage system 430 and storage system 440 without ever being completed. Including a power threshold for the remote storage system in redirect policy 434 eliminates this possibility. That being said, if storage system 430 and storage system 440 are in different geographical regions, it is unlikely that both storage systems will be operating at peak times concurrently.

Redirect policy 434 may also define classes of I/O that are not permitted to be redirected to storage system 440. The increase in response time for reads serviced by the remote system may be undesirable for some types of applications. A classification of I/O types may identify reads that are permitted to have response time degradation. The classification of I/O types may also provide a priority level such that I/O reads with a lower priority are redirected first, while I/O reads with a higher priority are serviced locally.

Thus, for each write, storage system 430 performs the write locally and performs a dual copy to storage system 440 for disaster recovery. For each I/O read, redirect mechanism 432 determines whether power reduction is required and, if so, determines whether to perform the I/O operation locally at storage system 430 or to redirect the I/O operation to storage system 440. Redirecting all or a portion of I/O read operations to storage system 440 may result in a significant reduction of power consumption at storage system 430.

While FIG. 4 illustrates the redirect mechanism 432 as part of the storage system 430, the redirect mechanism 432 may be embodied outside of storage system 430. For example, redirect mechanism 432 may be embodied within a component of fabric 412, as a device that intercepts I/O requests before they reach storage system 430, or within host 410. Other modifications may be made to the data processing system of FIG. 4 depending on the implementation without departing from the spirit and scope of the illustrative embodiment. For example, the data processing system may perform remote copy among three or more storage systems.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) or computer recordable mediums may be utilized. The computer-usable or computer-readable medium may be, for example, but not limited to, an electronic, magnetic, optical, electromagnetic, infrared, or semiconductor system, apparatus, device, or propagation medium. Computer recordable mediums may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable and/or computer-recordable medium that can direct a computer or other programmable data processing apparatus to function in a particular manner, such that the instructions stored in the computer-readable and/or computer-recordable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
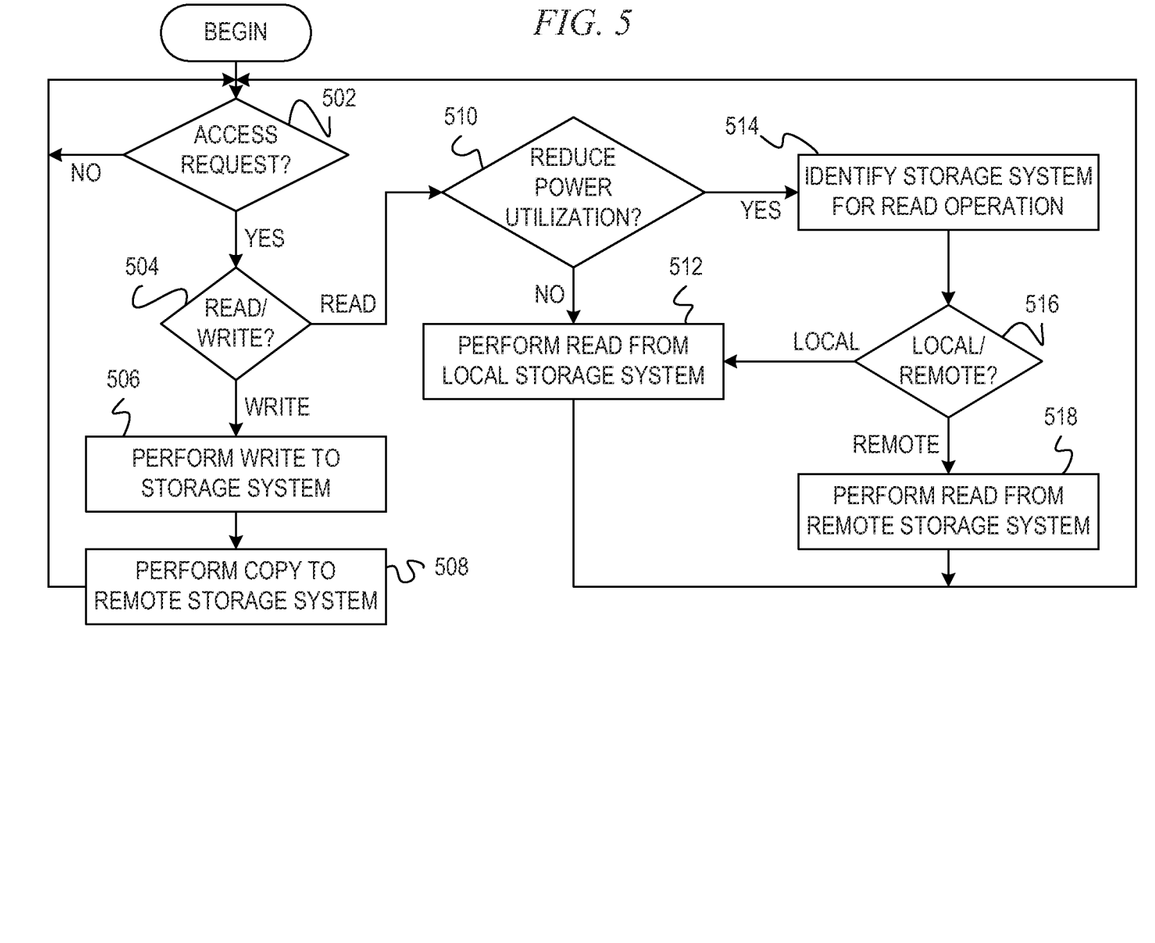
FIG. 5 provides a flowchart outlining example operations of a redirect mechanism for reducing storage system power consumption in a remote copy configuration in accordance with an illustrative embodiment.

FIG. 5 provides a flowchart outlining example operations of a redirect mechanism for reducing storage system power consumption in a remote copy configuration in accordance with an illustrative embodiment. Operation begins, and the redirect mechanism determines whether an access request is received at the local storage system (block 502). Responsive to a determination that an access request is not received, operation returns to block 502 until an access request is received.

Responsive to a determination that an access request is received in block 502, the redirect mechanism determines whether the access request is a read or a write (block 504). If the access request is a write, the storage system performs the write to the local storage (block 506) and performs a copy to the remote storage system (block 508). Thereafter, operation returns to block 502 to determine whether an access request is received.

Returning to block 504, if the access request is a read, the redirect mechanism determines whether to reduce power utilization (block 510). This determination may be made, for example, by Comparing current power utilization against a threshold, which may be a percentage of a power usage cap, or by consulting a power management policy. If the redirection mechanism determines that reduction of power utilization is not desired or required in block 510, then the storage system performs the read operation from the local storage system (block 512). Thereafter, operation returns to block 502 to determine whether an access request is received.

If the redirect mechanism determines that reduction of power utilization is desired in block 510, then the redirect mechanism identifies a storage system to perform the read operation (block 514). This identification may be made based on a redirect policy and based on response time data, I/O demand data, and power usage data. For example, the redirect mechanism may identify the remote storage system for the read operation when local power usage reaches a predetermined percentage of the cap. As another example, the redirect mechanism may identify the local storage system for the read operation when latency becomes higher than a predetermined threshold, when the remote storage system experiences high I/O demand, or when a class or priority associated with the access request indicates that the request should be serviced locally.

The redirect mechanism then determines whether to direct the read operation to the local storage system or redirect the read operation to the remote storage system (block 516). If the redirect mechanism determines that the read operation is to be directed to the local storage system, then the storage system performs the read operation from local storage (block 512), and operation returns to block 502 to determine whether an access request is received. If the redirect mechanism determines that the read operation is to be redirected to the remote storage system in block 516, then the redirect mechanism redirects the access request to the remote storage system such that the remote storage performs the read operation (block 518), and operation returns to block 502 to determine whether an access request is received.

Thus, the redirect mechanism is configured to reduce local power consumption by redirecting all or a portion of read I/O to a remote storage system. The redirect mechanism leverages the dual copy configuration to perform reads at a remote storage system that may be in a different power region and may be experiencing different I/O demand. The redirect mechanism may take into account I/O demand and power usage data to balance power usage between the two storage systems. The redirect mechanism may also use I/O classification to prioritize I/O reads to serve locally vs. redirection. This reduction in power consumption could allow the system to meet I/O demand while avoiding a costly cap violation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program recorded thereon, wherein the computer readable program, when executed on a computing device, causes the computing device to:
   receive, by the computing device, an access request, wherein the access request is directed to a local storage system;
   responsive to the access request being a read request, determine whether to redirect the read request to a remote storage system based on power consumption at the local storage system; and
   responsive to a determination to redirect the read request to the remote storage system, redirect the read request to the remote storage system.

2. The computer program product of claim 1, wherein determining whether to redirect the read request to the remote storage system comprises:
   determining whether local power consumption reaches at least one of a plurality of predetermined thresholds, wherein each of the predetermined thresholds is one of an amount of power consumed by the local storage system or a percentage of a power utilization cap defined in a power usage agreement.

3. The computer program product of claim 2, wherein in response to a first predetermined threshold in the plurality of predetermined thresholds being reached by the local power consumption, a first non-zero amount of read requests are redirected to the remote storage system, and wherein in response to a second predetermined threshold in the plurality of predetermined thresholds being reached by the local power consumption, a second non-zero amount of read requests, different from the first non-zero amount of read access requests, are redirected to the remote storage system.

4. The computer program product of claim 1, wherein determining whether to redirect the read request to the remote storage system comprises:
   determining whether latency associated with redirecting read requests to the remote storage system is greater than a latency threshold; and
   stopping redirection of read requests to the remote storage system in response to the latency being greater than the latency threshold.

5. The computer program product of claim 4, wherein determining whether to redirect the read request to the remote storage system further comprises:
   turning off at least one storage device in the local storage system in response to a determination that the latency associated with redirecting read requests to the remote storage system is greater than the latency threshold.

6. The computer program product of claim 1, wherein determining whether to redirect the read request to the remote storage system comprises:
   determining whether input/output demand at the remote storage system reaches a demand threshold; and
   stopping redirection of read requests to the remote storage system in response to the input/output demand at the remote storage system reaching the demand threshold.

7. The computer program product of claim 1, wherein determining whether to redirect the read request to the remote storage system comprises:
   determining whether power consumption at the remote storage system reaches a power threshold; and
   stopping redirection of read requests to the remote storage system in response to the power consumption at the remote storage system reaching the power threshold.

8. The computer program product of claim 1, wherein determining whether to redirect the read request to the remote storage system comprises:
   determining whether a classification type of the read request is permitted to be redirected; and
   inhibiting redirection of the read request in response to the classification type indicating a classification type that is not permitted to be redirected.

9. The computer program product of claim 1, wherein determining whether to redirect the read request to the remote storage system comprises:
   determining whether to redirect the read request based on a priority of the read request, wherein read requests having a relatively lower priority than other read requests are redirected to the remote storage system prior to redirecting read requests having a relatively higher priority than other read requests.

10. The computer program product of claim 1, wherein the computer readable program further causes the computing device to:
    responsive to the access request being a write request, performing a write operation to the local storage system; and
    performing a dual copy of the write operation to the remote storage system.

11. The computer program product of claim 1, wherein the local storage system executes write access requests on storage devices of the local storage system while redirecting at least a portion of read requests to the remote storage system based on power consumption at the local storage system.

12. The computer program product of claim 1, wherein determining whether to redirect the read request to the remote storage system comprises at least one of:
    determining whether local power consumption reaches at least one of a plurality of predetermined thresholds, wherein each of the predetermined thresholds is one of an amount of power consumed by the local storage system or a percentage of a power utilization cap defined in a power usage agreement;

determining whether latency associated with redirecting read requests to the remote storage system is greater than a latency threshold;

determining whether input/output demand at the remote storage system reaches a demand threshold;

determining whether power consumption at the remote storage system reaches a power threshold;

determining whether a classification type of the read request is permitted to be redirected; or determining whether to redirect the read request based on a priority of the read request, wherein read requests having a relatively lower priority than other read requests are redirected to the remote storage system prior to redirecting read requests having a relatively higher priority than other read requests.

13. A method, in a data processing system, for reducing storage system power consumption in a remote copy configuration, the method comprising:

receiving an access request in the data processing system;

responsive to the access request being a read request, determining whether to redirect the read request to a remote storage system based on a power management policy; and responsive to a determination to redirect the read request to the remote storage system, redirecting the read request to the remote storage system.

14. The method of claim 13, wherein determining whether to redirect the read request to the remote storage system comprises:

determining whether local power consumption reaches at least one of a plurality of predetermined thresholds, wherein each of the predetermined thresholds is one of an amount of power consumed by the local storage system or a percentage of a power utilization cap defined in a power usage agreement.

15. The method of claim 14, wherein in response to a first predetermined threshold in the plurality of predetermined thresholds being reached by the local power consumption, a first non-zero amount of read requests are redirected to the remote storage system, and wherein in response to a second predetermined threshold in the plurality of predetermined thresholds being reached by the local power consumption, a second non-zero amount of read requests, different from the first non-zero amount of read access requests, are redirected to the remote storage system.

16. The method of claim 13, wherein determining whether to redirect the read request to the remote storage system comprises:

determining whether latency associated with redirecting read requests to the remote storage system is greater than a latency threshold; and stopping redirection of read requests to the remote storage system in response to the latency being greater than the latency threshold.

17. The method of claim 13, wherein determining whether to redirect the read request to the remote storage system comprises:

determining whether input/output demand at the remote storage system reaches a demand threshold; and stopping redirection of read requests to the remote storage system in response to the input/output demand at the remote storage system reaching the demand threshold.

18. The method of claim 17, wherein determining whether to redirect the read request to the remote storage system further comprises:

turning off at least one storage device in the local storage system in response to a determination that the latency associated with redirecting read requests to the remote storage system is greater than the latency threshold.

19. The method of claim 13, wherein determining whether to redirect the read request to the remote storage system comprises:

determining whether to redirect the read request based on a classification type or priority of the read request; and inhibiting redirection of the read request in response to the classification type indicating a classification type that is not permitted to be redirected, wherein read requests having a relatively lower priority than other read requests are redirected to the remote storage system prior to redirecting read requests having a relatively higher priority than other read requests.

20. The method of claim 13, wherein the local storage system executes write access requests on storage devices of the local storage system while redirecting at least a portion of read requests to the remote storage system based on power consumption at the local storage system.

21. The method of claim 13, wherein determining whether to redirect the read request to the remote storage system comprises at least one of:

determining whether local power consumption reaches at least one of a plurality of predetermined thresholds, wherein each of the predetermined thresholds is one of an amount of power consumed by the local storage system or a percentage of a power utilization cap defined in a power usage agreement;

determining whether latency associated with redirecting read requests to the remote storage system is greater than a latency threshold;

determining whether input/output demand at the remote storage system reaches a demand threshold;

determining whether power consumption at the remote storage system reaches a power threshold;

determining whether a classification type of the read request is permitted to be redirected; or determining whether to redirect the read request based on a priority of the read request, wherein read requests having a relatively lower priority than other read requests are redirected to the remote storage system prior to redirecting read requests having a relatively higher priority than other read requests.

22. An apparatus, comprising:

a processor; and a memory coupled to the processor, wherein the memory comprises instructions which, when executed by the processor, cause the processor to:

receive an access request, wherein the access request is directed to a local storage system;

responsive to the access request being a read request, determine whether to redirect the read request to a remote storage system based on power consumption at the local storage system; and responsive to a determination to redirect the read request to the remote storage system, redirect the read request to the remote storage system.

23. The apparatus of claim 22, wherein determining whether to redirect the read request to the remote storage system comprises:

determining whether local power consumption reaches at least one of a plurality of predetermined thresholds, wherein each of the predetermined thresholds is one of an amount of power consumed by the local storage system or a percentage of a power utilization cap defined in a power usage agreement.

24. The apparatus of claim 23, wherein in response to a first predetermined threshold in the plurality of predetermined thresholds being reached by the local power consumption, a first non-zero amount of read requests are redirected to the remote storage system, and wherein in response to a second predetermined threshold in the plurality of predetermined thresholds being reached by the local power consumption, a second non-zero amount of read requests, different from the first non-zero amount of read access requests, are redirected to the remote storage system.

25. The apparatus of claim 22, wherein determining whether to redirect the read request to the remote storage system comprises:
   determining whether latency associated with redirecting read requests to the remote storage system is greater than a latency threshold; and
   stopping redirection of read requests to the remote storage system in response to the latency being greater than the latency threshold.

26. The apparatus of claim 25, wherein determining whether to redirect the read request to the remote storage system further comprises:
   turning off at least one storage device in the local storage system in response to a determination that the latency associated with redirecting read requests to the remote storage system is greater than the latency threshold.

27. The apparatus of claim 22, wherein determining whether to redirect the read request to the remote storage system comprises:
   determining whether input/output demand at the remote storage system reaches a demand threshold; and
   stopping redirection of read requests to the remote storage system in response to the input/output demand at the remote storage system reaching the demand threshold.

28. The apparatus of claim 22, wherein determining whether to redirect the read request to the remote storage system comprises:
   determining whether to redirect the read request based on a classification type or priority of the read request; and
   inhibiting redirection of the read request in response to the classification type indicating a classification type that is not permitted to be redirected, wherein read requests having a relatively lower priority than other read requests are redirected to the remote storage system prior to redirecting read requests having a relatively higher priority than other read requests.

29. The apparatus of claim 22, wherein the local storage system executes write access requests on storage devices of the local storage system while redirecting at least a portion of read requests to the remote storage system based on power consumption at the local storage system.

30. The apparatus of claim 22, wherein determining whether to redirect the read request to the remote storage system comprises at least one of:
   determining whether local power consumption reaches at least one of a plurality of predetermined thresholds, wherein each of the predetermined thresholds is one of an amount of power consumed by the local storage system or a percentage of a power utilization cap defined in a power usage agreement;
   determining whether latency associated with redirecting read requests to the remote storage system is greater than a latency threshold;
   determining whether input/output demand at the remote storage system reaches a demand threshold;
   determining whether power consumption at the remote storage system reaches a power threshold;
   determining whether a classification type of the read request is permitted to be redirected; or
   determining whether to redirect the read request based on a priority of the read request, wherein read requests having a relatively lower priority than other read requests are redirected to the remote storage system prior to redirecting read requests having a relatively higher priority than other read requests.

* * * * *